(12) United States Patent
Rohrbach et al.

(10) Patent No.: US 7,517,222 B2
(45) Date of Patent: Apr. 14, 2009

(54) MAGNETIC CONNECTOR FOR ELECTRONIC DEVICE

(75) Inventors: Matthew Dean Rohrbach, San Francisco, CA (US); Mark Edward Doutt, San Jose, CA (US); Bartley K. Andre, Menlo Park, CA (US); Kanye Lim, Sunnyvale, CA (US); John C. Difonzo, Emerald Hills, CA (US); Jean-Marc Gery, Los Angeles, CA (US)

(73) Assignee: APPLE Inc., Cupertino, CA (US)

( * ) Notice: Subject to any disclaimer, the term of this patent is extended or adjusted under 35 U.S.C. 154(b) by 0 days.

(21) Appl. No.: 11/876,733

(22) Filed: Oct. 22, 2007

(65) Prior Publication Data

US 2008/0096398 A1 Apr. 24, 2008

Related U.S. Application Data

(63) Continuation of application No. 11/235,875, filed on Sep. 26, 2005, now Pat. No. 7,311,526.

(51) Int. Cl.
*H01R 13/60* (2006.01)
(52) U.S. Cl. ........................................................ 439/39
(58) Field of Classification Search .................. 439/39, 439/38, 40
See application file for complete search history.

(56) References Cited

U.S. PATENT DOCUMENTS

| | | | |
|---|---|---|---|
| 7,311,526 B2 * | 12/2007 | Rohrbach et al. | 439/39 |
| 7,364,433 B2 * | 4/2008 | Neidlein | 439/66 |
| 2004/0077187 A1 * | 4/2004 | Belongia et al. | 439/39 |
| 2004/0209489 A1 * | 10/2004 | Clapper | 439/39 |

* cited by examiner

*Primary Examiner*—Gary F. Paumen
(74) *Attorney, Agent, or Firm*—Townsend and Townsend and Crew LLP

(57) ABSTRACT

An electrical plug and receptacle relying on magnetic force to maintain contact are disclosed. The plug and receptacle can be used as part of a power adapter for connecting an electronic device, such as a laptop computer, to a power supply. The plug includes electrical contacts, which are preferably biased toward corresponding contacts on the receptacle. The plug and receptacle each have a magnetic element. The magnetic element on one or both of the plug and receptacle can be a magnet, which is preferably a permanent rare earth magnet although electromagnets may also be used. The magnetic element on the plug or receptacle that does not include a magnet is composed of ferromagnetic material. When the plug and receptacle are brought into proximity, the magnetic attraction between the magnet and its complement, whether another magnet or a ferromagnetic material, maintains the contacts in an electrically conductive relationship.

42 Claims, 9 Drawing Sheets

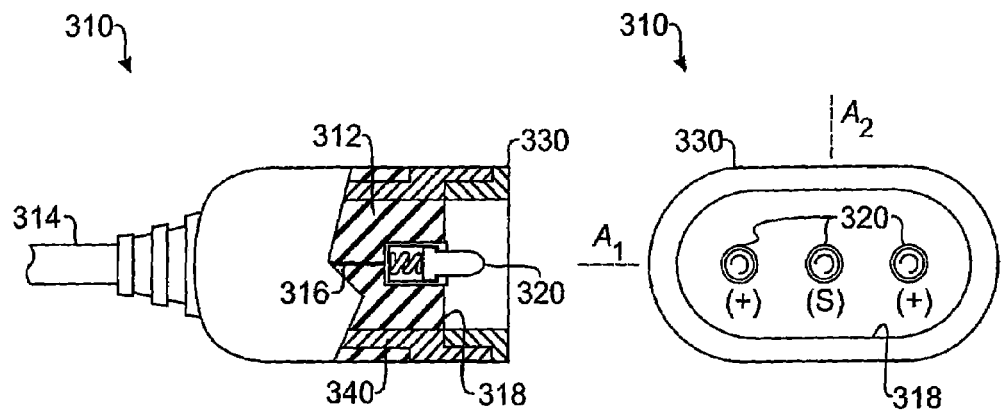
FIG. 8A  FIG. 8B
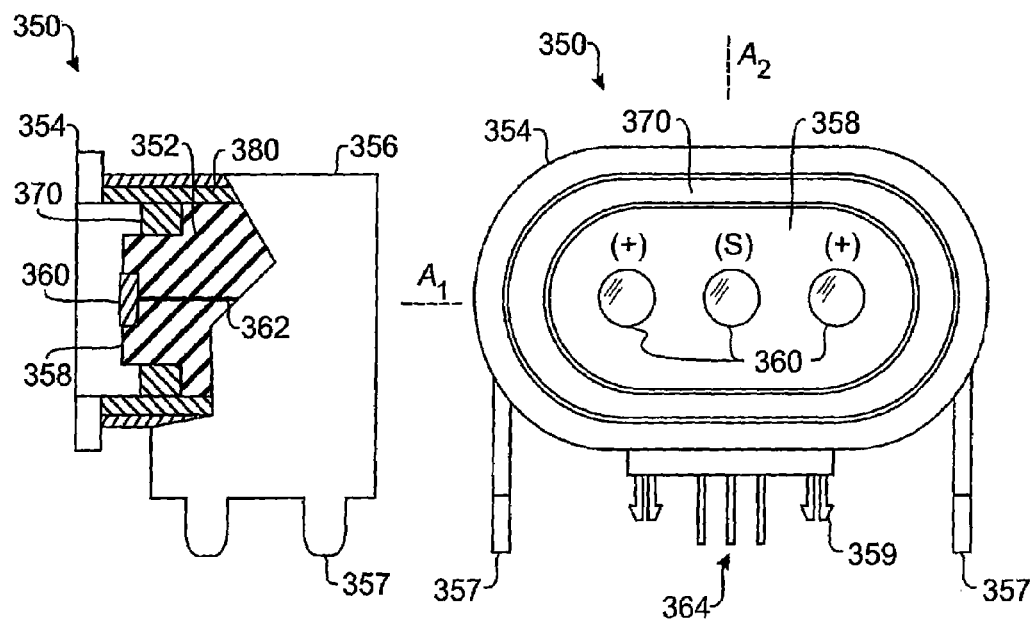
FIG. 9A  FIG. 9B

MAGNETIC CONNECTOR FOR ELECTRONIC DEVICE

CROSS-REFERENCE TO RELATED APPLICATIONS

This application is a continuation of U.S. application Ser. No. 11/235,875, filed Sep. 26, 2005, which was filed concurrently with U.S. patent application Ser. No. 11/235,873 having U.S. Express Mail No. EV 697139443 US and entitled "Electromagnetic Connector for Electronic Device." Both applications are incorporated herein by reference in their entirety.

FIELD OF THE DISCLOSURE

The subject matter of the present disclosure generally relates to a magnetic connector for an electronic device and more particularly relates to a magnetic connector for a power adapter connecting a laptop computer to a power supply.

BACKGROUND OF THE DISCLOSURE

Electronic devices, such as laptop computers, typically use DC power supplied from a transformer connected to a conventional AC power supply. Referring to FIG. 1, a power adapter 20 according to the prior art is illustrated. The power adapter 20 has a transformer 22, a power cable 26, a male connector 30, and a female connector 40. The transformer 22 has a plug 24 for connecting to a conventional AC power outlet (not shown), and the male connector 30 is connected to the transformer 22 by power cable 26. The female connector 40 is typically attached to the housing 12 of an electronic device 10, such as a laptop computer, and is typically attached to a printed circuit board 14 of the internal electronics of the device 10. To make the conventional power connection between the transformer 22 and the device 10, the male connector 30 has a male end 32 that inserts into the female connector 40. Connectors for portable computers are preferably as small as possible and low profile for today's thin notebooks.

Damage can occur to the conventional power connection in a number of ways. In one example, simply inserting the male connector 30 into the female connector 40 can cause damage. In another example shown in FIG. 2, damage can occur when any of the components (e.g., the device 10, male connector 30, transformer 22, etc.) is inadvertently pulled away from other components by a non-axial force while the male and female connectors 30 and 40 are still connected together. In addition to conventional power connections, damage of other types of connections to electronic devices can also occur in the same ways described above.

In general, the surface area of two magnetically attracted halves determines the number of magnetic flux lines and therefore the holding force between them because the holding force is proportional to the contact area between the two magnetically attracted halves. Thus, to have a strong force holding the two magnetically attracted halves together, the two magnetically attracted halves want to be as large as possible.

The subject matter of the present disclosure is directed to overcoming, or at least reducing the effects of, one or more of the problems set forth above.

SUMMARY OF THE DISCLOSURE

A magnetic connector that relies on magnetic force for maintaining contact is disclosed. The magnetic connector includes a plug and a receptacle. In one embodiment, the plug and receptacle can be used as part of a power adapter for connecting an electronic device, such as a laptop computer, to a transformer connectable to a power supply. The plug includes a plurality of electrical pins, which are preferably biased towards a corresponding plurality of contacts positioned on the receptacle. The plug and receptacle each have a magnetic element. The magnetic element on one or both of the plug and receptacle can be a magnet, which is preferably a permanent rare earth magnet although electromagnets may also be used. A ferromagnetic element can be used for the magnetic element on the plug or receptacle that does not include a magnet. When the plug and receptacle are brought into proximity, the magnetic attraction between the magnet and its complement, whether another magnet or a ferromagnetic material, magnetically couples the plug and the receptacle and maintains the pins and contacts in an electrically conductive relationship. The magnetic connector allows the plug to break away from the receptacle if the plug or receptacle is inadvertently moved (with sufficient force) while still connected.

The foregoing summary is not intended to summarize each potential embodiment or every aspect of the present disclosure.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which:

FIG. 3 illustrates a cross-sectional view of an embodiment of a magnetic connector according to certain teachings of the present disclosure.

FIGS. 8A-8B illustrate a plug of another embodiment of a magnetic connector according to certain teachings of the present disclosure.

FIGS. 9A-9B illustrate a receptacle for the plug of the disclosed magnetic connector of FIGS. 8A-8B.

Figure 1:
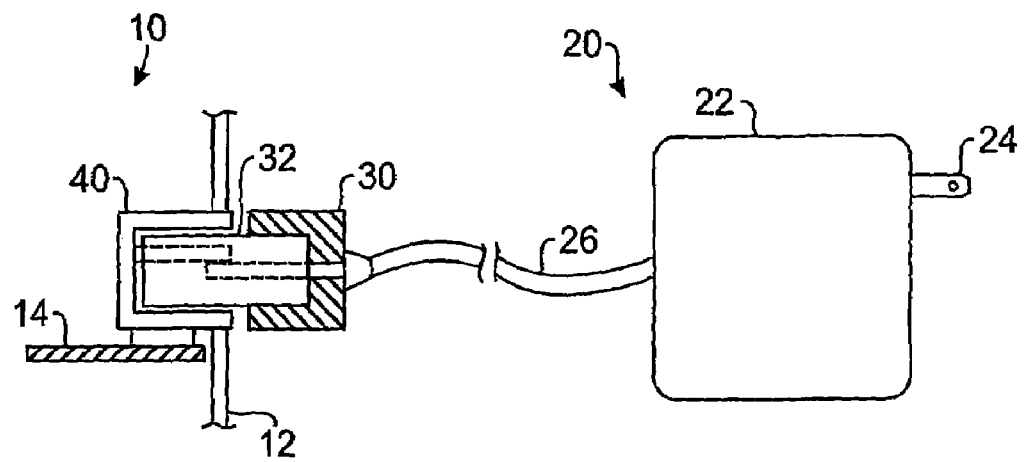
FIG. 1 illustrates a power adapter having a power connection according to the prior art.
Figure 2:
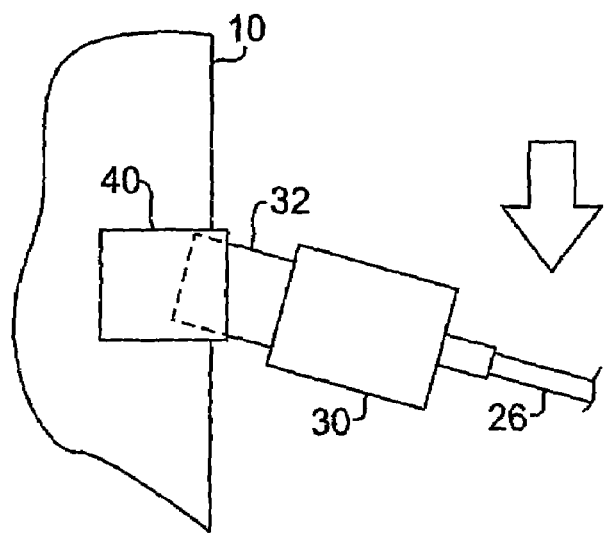
FIG. 2 illustrates a type of possible damage resulting from the prior art power connection.

While the disclosed magnetic connectors are susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 3, an embodiment of a magnetic connector 100 according to certain teachings of the present disclosure is illustrated in a cross-sectional view. The magnetic connector 100 includes a first connector or plug 110 and a second connector or receptacle 150. The plug 110 is connectable to a first device or electrical relation 50, while the receptacle 150 is connectable to a second device 60. In one embodiment, the first device 50 is a transformer, and the second device 60 is an electronic device, such as a laptop computer, having a housing 62 and internal electronics 64. Therefore, in one embodiment, the magnetic connector 100 can be part of a power adapter for connecting the laptop computer 60 to a conventional AC power supply (not shown) with the transformer 50. For a standard laptop computer, the magnetic connector 100 is preferably rated for 6 A at 24V, and the plug 110 and receptacle 150 can both be approximately 4-mm tall and 6-mm wide.

The plug 110 includes a plug body 112 having a face 118 and connected to a cable 114. Preferably, the body 112 is composed of a conventional non-conductive material. The body 112 houses internal wires 116 of the cable 114, which connects to the first device 50. A plurality of first electrical contacts 120 and a first magnetic element 130 are positioned on the plug body 112. In a preferred embodiment and as shown in FIG. 3, the first electrical contacts 120 are preferably plated and spring loaded pins to maintain contact with the corresponding contacts on the receptacle 150. The pins 120 are held in housings 124 and are connected to the wires 116 of the cable 114. Springs 122 bias the pins 120 so that they extend from the face 118 of the plug body 112. In the present embodiment, the first magnetic element 130 is embedded in the face 118 of the plug body 112.

The receptacle 150 has a body 152 connected to the housing 62 of the second device 60. The body 152 has a face 158, a plurality of second electrical contacts 160, and a second magnetic element 140. In a preferred embodiment and as shown in FIG. 3, the second electrical contacts 160 are plates embedded in the face 158 of the body 152 and electrically connected to the internal electronics 64 by wires 162 or the like. In addition, the second magnetic element 170 is embedded in the face 118 of the body 152.

To make the electrical connection between the first and second devices 50 and 60, the face 118 of the plug 110 is positioned against the face 158 of the receptacle 150. The pins 120 on the plug 110 engage the plates 160 on the receptacle 150. Thus, the wires 116 connected to the first device 50 are electrically connected to the wires 162 connecting to the internal electronics 64 of the second device 60. As will be appreciated by one skilled in the art, electrical connection between pointed pins 120 and substantially flat plates 160 is preferred for a number of reasons, such as issues related to Hertzian stresses around a contact point and issues related to contact asperities or aspots.

To maintain the electrical connection, the attractive force between the first and second magnetic elements 130 and 170 holds the plug 110 to the receptacle 150. In one embodiment, both magnetic elements 130 and 170 are magnets, either permanent or electromagnetic, arranged to attract magnetically to one another. In an alternative embodiment, either magnetic element 130 or 170 is a magnet, either permanent or electromagnetic, while the other complementary element is a ferromagnetic material. The permanent magnet used for the magnetic elements is preferably a permanent rare earth magnet because rare earth magnets have a high flux density compared to their size. When the plug 110 and receptacle 150 are brought into proximity, the attractive force between the magnetic elements 130 and 170 maintains the contacts 120 and 160 in an electrically conductive relationship.

The magnetic attraction or force of the plug 110 coupled to the receptacle 150 can be configured for a particular implementation as desired. For embodiments of the magnetic connector 100 used for a power adapter, the magnetic field produced by the magnetic attraction between the elements 130 and 170 is small enough not to interfere with the supply of power through the electrical contacts 120 and 160. Because magnetic fields of the elements 130 and 170 may interfere with the internal electronics 64 and other components of the device 60, the receptacle 150 may be positioned on the housing 150 at a location away from various components. For example, the receptacle 150 may be positioned away from disk drives, USB ports, internal busses, etc. of a laptop computer. Alternatively, the elements 130 and 170 may be shielded from various components of the electronic device, or a flux bar may be used to direct any magnetic flux of the elements 130 and 170 away from various components.

Figure 4:
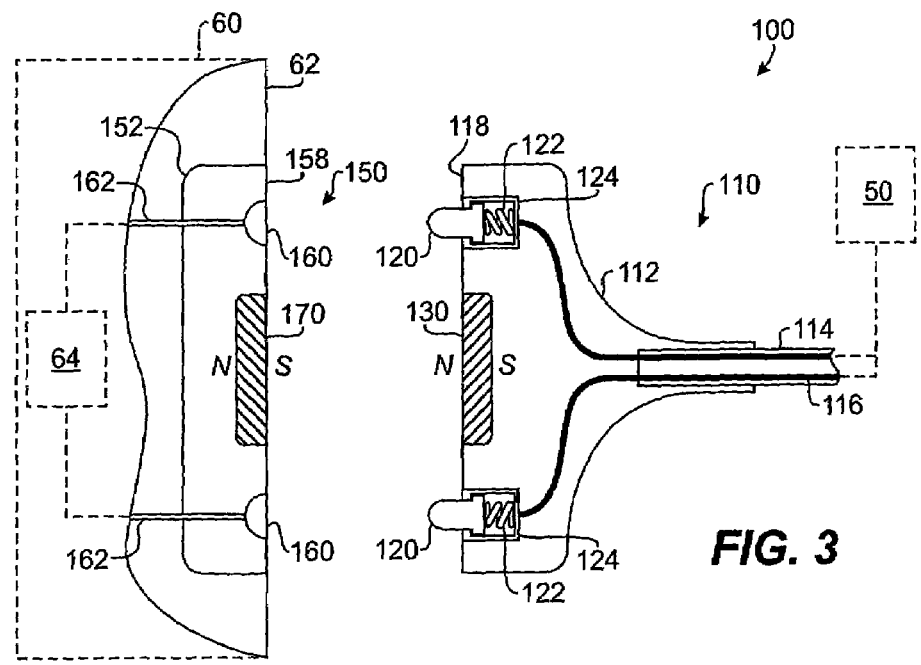
FIG. 4 illustrates a front view of a receptacle of the magnetic connector of FIG. 3.

In one embodiment shown in the front view of FIG. 4, the receptacle 150 has four electrical plates 160 positioned around the centrally located magnetic element 170. The body 152 of the receptacle is oval or oblong and has two axes of symmetry. For the embodiment of the receptacle 150 requiring DC power, two of the electrical plates 160(+) may be positive contacts, and two of the plates 120(−) may be negative contacts. Various arrangements are possible and would be within the abilities on one skilled in the art.

Figure 5:
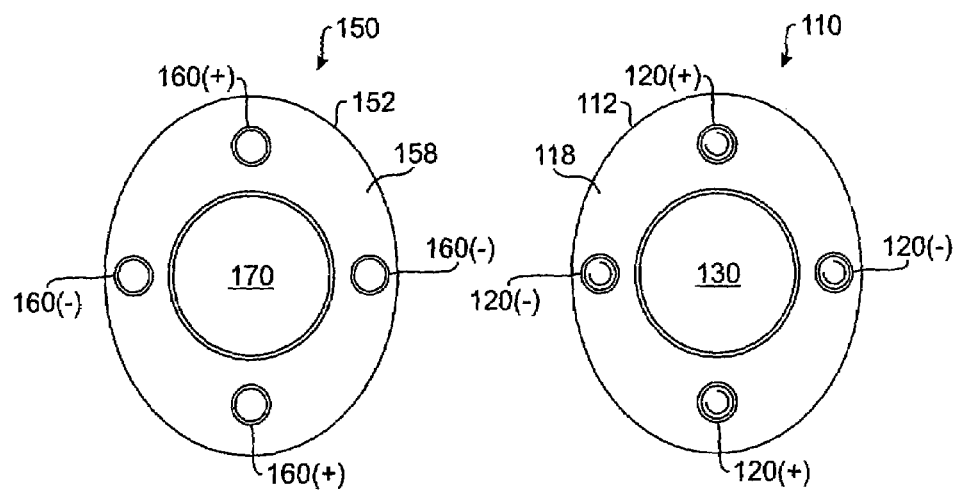
FIG. 5 illustrates a front view of a plug of the magnetic connector of FIG. 3.

In the embodiment shown in the front view of FIG. 5, the plug 110 is made to correspond with the arrangement of the receptacle 150 in FIG. 4. Therefore, the body 112 of the plug 110 is also oval, and the plug has four pins 120 positioned around the magnetic element 130, which is centrally located on the plug 110. For the embodiment of the plug 110 connected to an AC to DC transformer, two of the electrical contacts 120(+) are positive contacts, and two of the contacts 120(−) are negative contacts.

The arrangement of the pins 120 and plates 160 is symmetrical along the axes of symmetry defined by the oval or oblong shape of the bodies 112 and 152. In this way, the plug 110 and receptacle 150 can be coupled in only two ways, and proper alignment of positive pins 120(+) with positive plates 160(+) and of negative pins 120(−) with negative plates 160(−) will be ensured. Although the plug 110 and receptacle 150 are shown having one magnetic element 130 and 170 each, it will be appreciated that each can include one or more magnetic elements. In addition, it will be appreciated that the plug 110 and receptacle 150 can each have one or more contacts, depending on the type of electrical connection to be made. For example, additional pins and contacts may be symmetrically arranged around the plug 110 and receptacle 150 for passing electrical signals between two devices, such as a laptop computer and power adapter.

Figure 6:
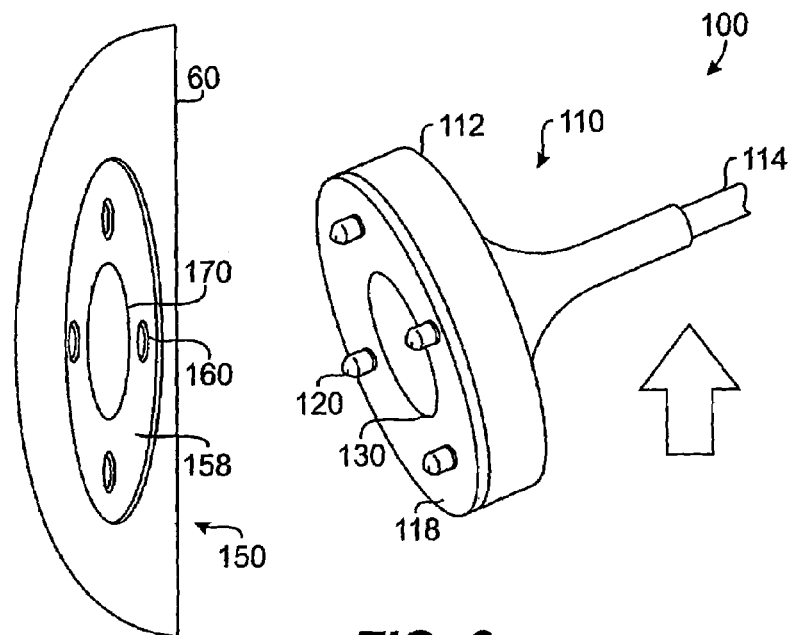
FIG. 6 illustrates an ability of the disclosed magnetic connector to prevent possible damage.

Referring to FIG. 6, an ability of the magnetic connector 100 to prevent possible damage is illustrated. The magnetic connector 100 substantially avoids damage because male components are not required to have an interference fit with female components to maintain both electrical and mechanical connection. Instead, a user of the connector 100 needs only to position the faces 118 and 158 of the plug 110 and receptacle 150 against or away from one another when making or releasing the electrical and magnetic connection therebetween. Being biased towards plates 160, the pins 120 can avoid damage while still maintaining contact with the plates 160. In addition, the magnetic connector 100 can substantially avoid damage by allowing the plug 110 and receptacle 150 to break free of one another when inadvertently pulled away from each other by a non-axial force. Although shown slightly recessed in the device 60, the face 158 of the receptacle 150 can also be flush with the housing or can protrude therefrom. However, the recess is used to prevent stray magnetic fields from interfering with other devices.

Figure 7:
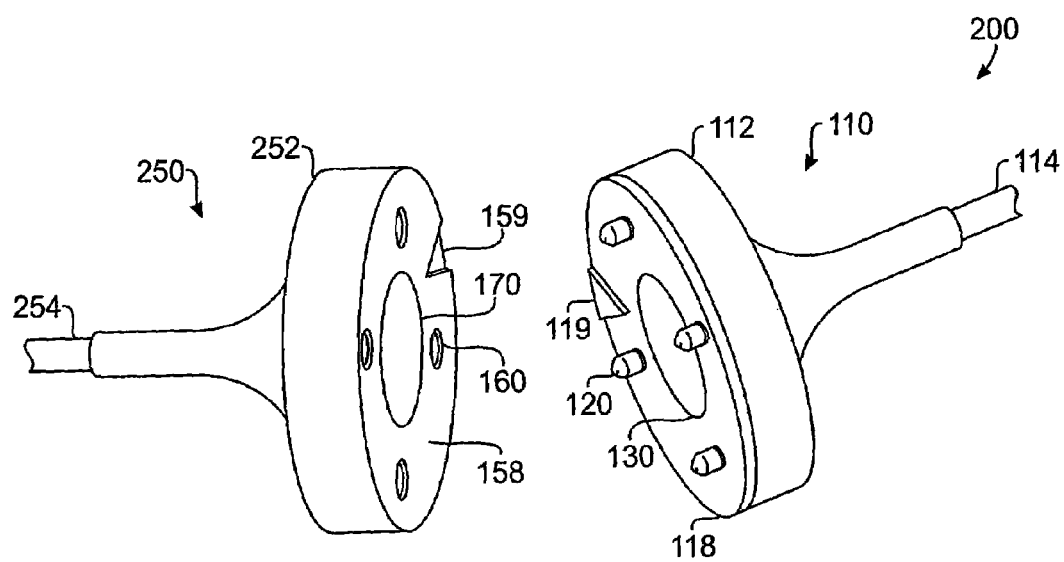
FIG. 7 illustrates an alternative embodiment of the magnetic connector of FIG. 3.

Referring to FIG. 7, another embodiment of a magnetic connector 200 according to certain teachings of the present disclosure is illustrated. This embodiment is substantially similar to the embodiment of FIGS. 3 through 5 so that like reference numbers indicate similar components. In contrast to previous embodiments, the receptacle 250 in this embodiment is not housed in a device (not shown) to which it is connected as with previous embodiments. Rather, the receptacle 250 resembles the plug 110 in that it has a body 252 that connects to the device with a cable 254. In addition, the bodies 112 and 252 of the plug 110 and receptacle 150 are substantially round. To ensure proper alignment of the pins 120 with the plates 160, the plug 110 and receptacle 150 have complementary guides 119 and 159 that allow for only one way of coupling them together. Although the guides 119 and 159 are shown on the faces 118 and 158 of the plug 110 and receptacle 150, it will be appreciated by one skilled in the art that a number of guides and techniques can be used to ensure proper alignment.

Referring to FIGS. 8A-8B and 9A-9B, another embodiment of a magnetic connector according to certain teachings of the present disclosure is illustrated. A first connector or plug 310 of the magnetic connector is shown in a partial side cross-section and in a front view of FIGS. 8A-8B. A second connector or receptacle 350 of the magnetic connector is shown in a partial side cross-section and in a front view of FIGS. 9A-9B. Both the plug 310 and receptacle 350 can be at least partially composed of transparent, non-conductive material and can include internal lights, such as LEDs, to illuminate them.

As shown in FIGS. 8A-8B, the plug 310 includes a body 312, a plurality of pins 320, and a first magnetic element 330, and a shell 340. The body 312 is made of any suitable non-conductive material and has an oblong shape with two axes of symmetry $A_1$ and $A_2$. The body 312 houses internal wires 316 of a cable 314, which connect the pins 320 to a first device (not shown), such as a transformer, for example. The pins 320 are biased by springs, and the pins 320 extend from a face 318, which is slightly recessed in the plug body 312. The first magnetic element 330 is positioned on the end of the plug body 312. As best shown in FIG. 8B, the first magnetic element 330 surrounds the recessed face 318 of the body 318.

For the embodiment of the plug 310 connected to a transformer, the centrally located pin 320 can be designated for signals used by the electronic device to determine the type of transformer or other device attached by the plug 310. The two outer located pins 320 can be designated for the positive DC power, and the outer shell 340 is designated for the return path of DC power. In this way, any orientation of the plug 310 will ensure proper connection of positive pins 320(+) and signal pin 320(S) of the plug 310 with corresponding contacts of the receptacle (350; FIGS. 9A-9B). Using the outer shell 340 for the return path is preferred because the plug 310 can have a smaller profile. In an alternative embodiment, however, the return path can be provided by additional pins (not shown) on the plug 310 and receptacle 350. For example, two additional pins (not shown) for the additional return path could be provided and symmetrically arranged on the plug 310 such that the pins would only align with corresponding contacts (not shown) of the receptacle 350 regardless of the orientation in which the plug 310 is coupled to the receptacle 350.

As shown in FIGS. 9A-9B, the receptacle 350 has a body 352, a plurality of contacts 360, and a second magnetic element 370, and a shell 380. The body 352 has a casing 356 with legs 357 for mechanical connection to a printed circuit board of internal electronics of a second device (not shown), such as a laptop computer, for example. The casing 356 can be composed of a conductive or non-conductive material. The body 352 has an oblong shape with two axes of symmetry $A_1$ and $A_2$ and is made of any suitable non-conductive material. As best shown in FIG. 9B, the body 352 also has snap connectors 359 for mechanical connection to a mounting base (not shown). In addition, the receptacle 350 has pins 364 for connecting the contacts 360 to internal electronics of the device.

The body 352 has an end 354 intended to extend outside the device housing the receptacle 350. This end 354 may be illuminated by techniques known in the art. The contacts 360 are positioned in a face 358 of the body 352. In the present embodiment, the contacts 360 are substantially flat plates electrically connected to the pins 364 by wires 362. The second magnetic element 370 is positioned about the face 358, and the second magnetic element 370 is preferably recessed from the face 358. Preferably, the recess of the second magnetic element 370 is slight and is comparable to the recess of the face (318) of the plug (310) in FIG. 8A. For the embodiment of the receptacle 350 intended to connect DC power to the device, the plates 360 are arranged to correspond with the positive pins (320(+)) and signal pin (320(S)) of the plug (310) of FIGS. 8A-8B, as described previously.

To make the electrical connection, the face 318 of the plug 310 of FIG. 8A is positioned against the face 358 of the receptacle 350 of FIG. 9A. The pins 320 on the plug 310 engage the plates 360 on the receptacle 350. To maintain the connection, the first and second magnetic elements 330 and 370 magnetically couple together and hold the plug 310 to the receptacle 350. In one embodiment, the magnetic elements 330 and 370 are both permanent magnets (preferably rare earth magnets) arranged to magnetically couple together. In another embodiment, one of the magnetic elements 330 and 370 can be a permanent magnet (preferably a rare earth magnet) or an electromagnet while the other element is a ferromagnetic material. Once coupled, the magnetic connector 300 allows the plug 310 to break away from the receptacle 350 in the event of inadvertent pulling of the plug 310 or the like.

Figure 10:
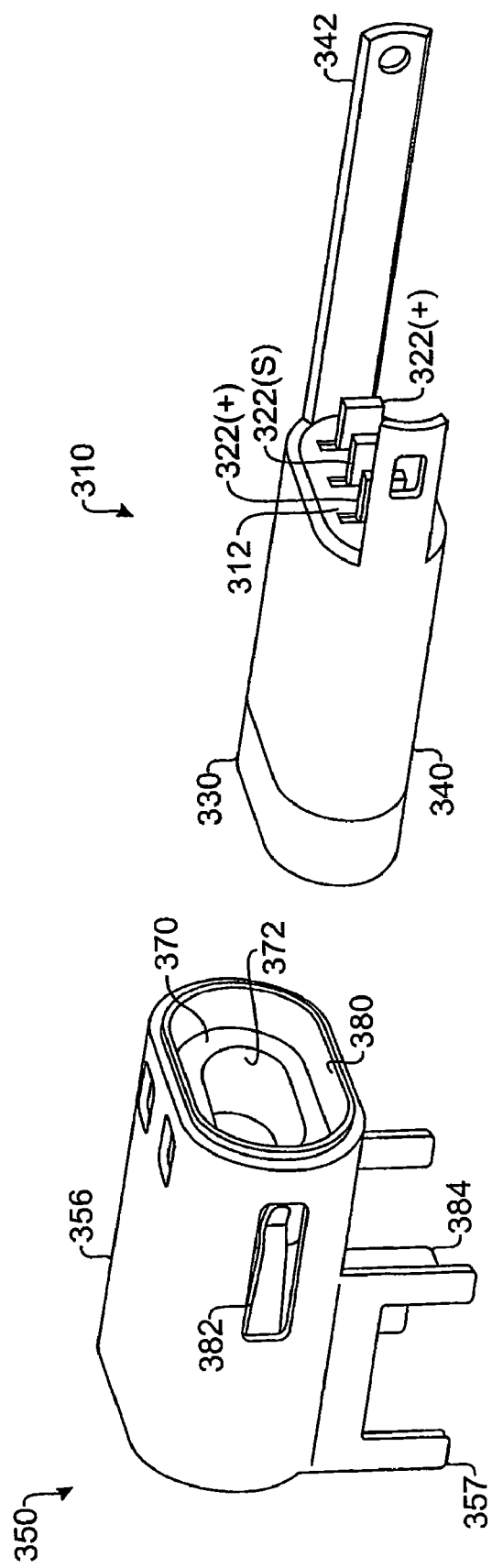
FIG. 10 illustrates a perspective view of the plug and receptacle for the disclosed magnetic connector of FIGS. 8A-8B and 9A-9B.

Referring to FIG. 10, additional details of the plug 310 and receptacle 350 for the disclosed magnetic connector of FIGS. 8A-8B and 9A-9B are illustrated in a perspective view. Portions of the plug 310 and receptacle 350 are not illustrated so that various details can be better shown. On the plug 310, the shell 340 abuts the magnetic element 310, which can be a ferromagnetic material. The shell 340 has an extension 342 for connecting to the return path of the power supply from the adapter (not shown) to which the plug 310 is connected. Three connectors 322(+), 322(S), and 322(+) extend from the back end of the body 312 for connecting the pins (not shown) with the positive power and signal from adapter to which the plug 310 is connected.

On the receptacle 350, the shell 380 for the return path of the power is positioned within the casing 356, and the magnetic element 370, which can be a permanent magnet, is positioned within the shell 380. An opening 372 through the magnetic element 370 allows for passage of body material (not shown) and contacts (not shown), as disclosed previously. Tabs or holders 382 of the shell 380 contact and hold the magnetic element 370. A leg 384 of the shell 380 extends from the receptacle 350 as do legs 357 of the casing 356.

When the plug 330 is coupled with the receptacle 350, the ferromagnetic material 330 of the plug 310 positions against the permanent magnet 370 and the inside of the casing 380 of the receptacle 350. Thus, the magnetic engagement between the ferromagnetic material 330 and the permanent magnet 370 holds the plug 310 to the receptacle. Moreover, the physical engagement between the ferromagnetic material 330 and the casing 380 creates the return path for power from the receptacle's shell pin 384 to the plug's shell pin 342.

Figure 11A:
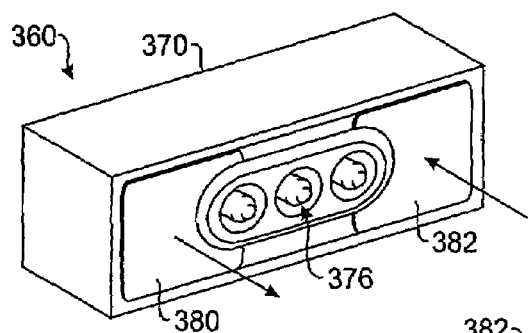
FIGS. 11A-11B illustrate an embodiment of a magnetic connector according to certain teachings of the present disclosure having a plurality of magnets and a back plate.
Figure 11B:
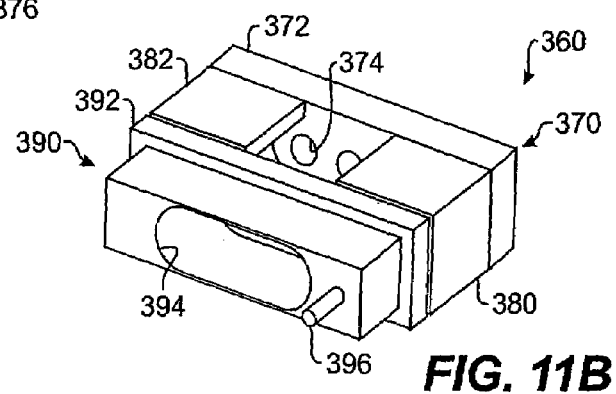

Referring to FIGS. 11A-11B, an embodiment of a magnetic connector 360 according to certain teachings of the present disclosure is illustrated. The connector 360 is compact and preferably has a low profile. In FIG. 11A, a plug 370 of the connector 360 is shown in a front perspective. In FIG. 11B, some of the internal components of plug 370 and a receptacle 390 are shown in a back perspective. The receptacle 390 is housed in an electronic device (not shown), and the plug 370 attaches to a cord or the like (not shown). As best shown in FIG. 11A, the plug 370 has magnets 380, 382 positioned on both sides of a plurality of contacts 376, which are similar to other contacts disclosed herein. For example, the central contact 376 is designated for a first path of electrical communication, and the two outer contacts 376 are designated for a second path of electrical communication. Preferably, the contacts 376 are biased pins where the central pin 376 carries a signal path and the two side pins carry a positive current. The magnets 380, 382 are arranged with opposite polarities, as indicated by the direction of the arrows in FIG. 11A. Preferably, the magnets 380, 382 are also designated for a third path of electrical communication.

As best shown in FIG. 11B, the plug 370 also has a back plate 372 connected between the back ends of the magnets 380, 382. The back plate 372 is made of a ferromagnetic material, such as steel. The receptacle 390 has an attraction plate 392 also made of a ferromagnetic material, such as steel. When the attraction plate 392 of receptacle 390 is attracted to the magnets 380, 382, the magnetic field lines travel through the steel attraction plate 392 from one magnet to the other, completing the magnetic circuit and producing a strong attracting force.

The attraction plate 392 of receptacle 390 defines an opening 394 for passage of the electrical contacts (not shown in FIG. 11B). Likewise, the back plate 372 of the plug 370 defines openings 374 for passage of leads from the electrical contacts (not shown). As noted above, the magnets 380, 382 can form a path of electrical communication between the receptacle 390 and the plug 370. Preferably, the magnets 380 and 382 and the attraction plate 392 carry negative current. Thus, the attraction plate 392 of the receptacle 390 includes a connector 396 for connecting to an electrical lead or the like (not shown).

Because the connector 360 is designed to be compact and have a low profile for fitting into a laptop or the like, the plates 372 and 392 must give up a certain amount of material to produce the openings 374 and 394. When the attraction plate 392 and magnets 380, 382 are coupled, magnetic attractive force can be limited because the flux density can saturate the narrower portions of ferromagnetic material in both the attraction plate 392 and the back plate 374. (Therefore, it may be desirable to use more than two magnets with the connector, as disclosed in the embodiment below). It may be desirable to have more than two magnets within the connector for two reasons. First, magnetic strength is a function of magnet thickness to cross section ratio (with thickness being defined by the dimension along the direction of magnetization). Second, for a given envelop, the leakage field associated with more than two permanent magnets is less than the leakage field associated with one or two permanent magnets.

Figure 12A:
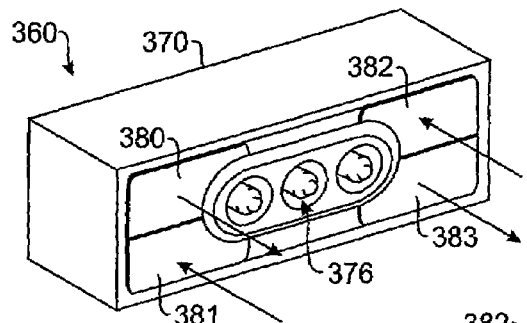
FIGS. 12A-12B illustrate another embodiment of a magnetic connector according to certain teachings of the present disclosure having a plurality of magnets and a back plate.
Figure 12B:
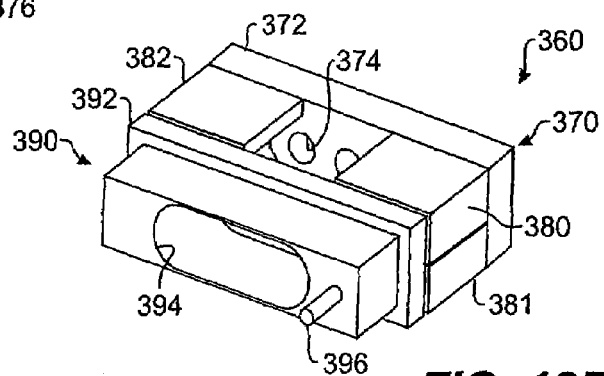

Referring to FIGS. 12A-12B, another embodiment of a magnetic connector 360 according to certain teachings of the present disclosure is illustrated. The magnetic connector 360 in FIGS. 12A-12B is substantially similar to that disclosed above so those like numerals indicate similar components between the embodiments. In the present embodiment, however, the plug 370 houses four magnets 380, 381, 382, and 383. Again, the magnets 380, 381, 382, and 383 are arranged with opposite polarities, as indicated by the arrows in FIG. 12A. In the present embodiment, the four magnets 380, 381, 382, and 383 form four magnetic circuits for the travel of magnetic flux. Accordingly, most of the flux travels between magnets on the same side (e.g., between magnets 380, 381 on the same side and between magnets 382, 383 on the same side). Because the flux lines are not constrained by the narrow portions of the plates 372 and 392, the flux density is less likely to saturate the plates 372 and 392. Therefore, the magnetic attractive force between the receptacle 390 and the plug 370 having four magnets 380-384 can be significantly greater than available in the embodiment of FIGS. 11A-11B, even though both embodiments have the same contact area.

As noted previously, the magnetic attraction or force coupling the plug 370 and the receptacle 390 can be configured as desired for a given implementation. In one embodiment, a straight pullout force to uncouple the plug 370 from the receptacle 390 is preferably between 3-lbf and 7-lbf. It should be noted that pulling the plug 370 out sideways, up, or down can produce torque. Preferably, the magnetic attraction produces less torque in the up direction but produces more torque in the other directions. Target torque values can be 0.5 kgf-cm for the up direction and 0.7 to 1.5 kgf-cm in the other directions.

In one aspect, the asymmetrical torque values can be achieved by extending the upper magnets 380 and 382 upwards. In this way, the upper magnets 380 and 382 are stronger and provide more attraction upwards than the lower magnets 381 and 383. One resulting effect is that there can be more holding force and displacement of the application point of the force upward, subsequently leading to more torque. This also helps compensate for any downward torque that may be produced by a cable (not shown) coupled to the plug 370. In another aspect, the asymmetrical torque values can be achieved by changing the angle of the magnetic flux lines in the upper magnets 380 and 382. For example, the separate, upper magnets 380 and 382 can have flux direction that point downward at an approximately 20-degree angle in comparison to the direction of coupling.

Figure 13A:
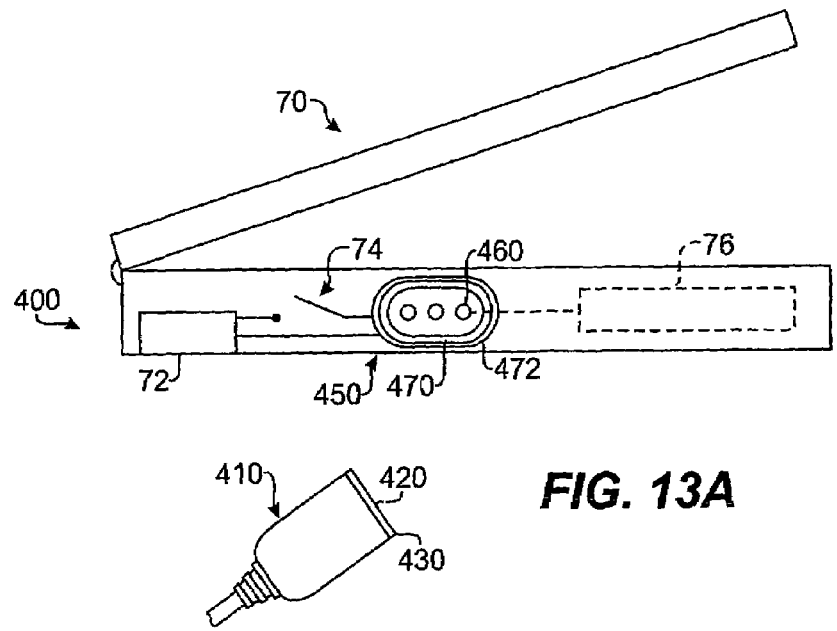
FIGS. 13A-13B illustrate embodiments of magnetic connectors according to certain teachings of the present disclosure having electromagnets.

Referring to FIG. 13A, an embodiment of a magnetic connector 400 having an electromagnet is illustrated. The connector 400 includes a plug 410 and a receptacle 450. The plug 410 is not substantially different from that disclosed in the embodiment of FIG. 8A-8B. The plug 410 has contacts 420 for conveying power from a transformer (not shown) and has a magnetic element 430, which can be a ferromagnetic material. The receptacle 450 has contacts 460 for conveying power to internal electronics 76 of the device 70, which is a laptop computer in the present embodiment.

In contrast to previous embodiments, the receptacle 450 has an electromagnet formed by a metal core 470 wrapped by a wire coil 472. Using an electromagnet in the plug 410 or receptacle 450 can overcome some of the disadvantages of having a permanent magnet on either the plug 410 or receptacle 450. For example, the electromagnet may reduce potential interference with internal components of the electronic device 70 or storage media.

The coil 472 is connected to a power supply or battery 72 of the laptop 70, and an internal switch 74 among other electronics can be used to operate the electromagnet of the core 470 and coil 472. The internal switch 74 causes power from the battery 72 to energized the electromagnet of core 470 and coil 472. Consequently, the energized electromagnet produces a magnetic field that attracts the ferromagnetic material 430 of the plug 410 and that can hold the plug 410 to the receptacle 450. The battery 72 can be an independent battery of the device or can be the same battery used to power the internal electronics 76 of the device 70. In either case, operation of the internal switch 74 and other electronics for connecting the battery 72 to the electromagnetic is preferably controlled to conserve power consumption of the battery 72.

Figure 13B:
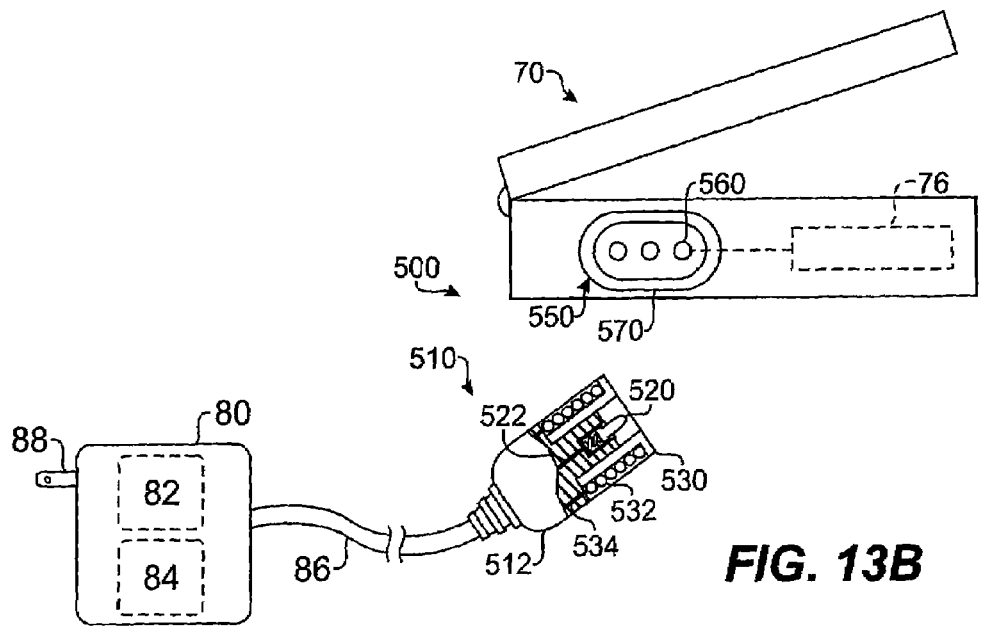

Referring to FIG. 13B, another embodiment of a magnetic connector 500 having an electromagnet is illustrated. The connector 500 includes a plug 510 and a receptacle 550. The receptacle 550 is not substantially different from that disclosed in the embodiment of FIG. 9A-9B. The receptacle 550 has contacts 560 for conveying power and signals to internal electronics 76 of the device 70. The receptacle 550 also has a magnetic element 570, which can be a ferromagnetic material. The plug 510 has contacts 520 for conveying power and signals from a power supply, such as power adapter 80, via wires 522 of a cable 86. In contrast to previous embodiments, the plug 510 has an electromagnet formed by a metal core 530 wrapped by a wire coil 532. The coil 532 is connected to a power supply by wires 534. For example, the coil 532 can draw power output from the transformer 82 of the adapter 80, form a conventional power supply to which the outlet plug 88 connects, or from a battery 84 housed internally in the adapter 80. Use of the battery 84 can overcome the need for a user to first connect the adapter 80 to the power supply before the electromagnet in the plug 510 is operated and can magnetically connect to the receptacle 550. The drawn power energizes the electromagnet of core 530 and coil 532 to produce a magnetic attraction to the ferromagnetic material 570 that can hold the plug 510 to the receptacle 550.

Figure 14:
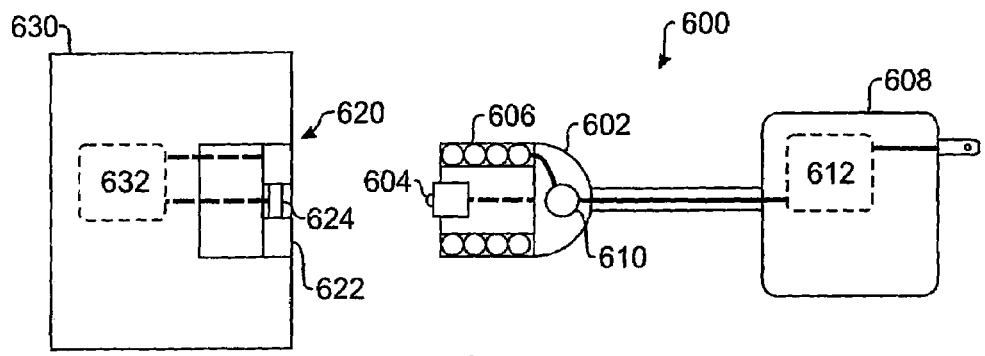
FIG. 14 illustrates an embodiment of a magnetic connector according to certain teachings of the present disclosure having an electromagnet and switch element.

Referring to FIG. 14, an embodiment of a magnetic connector 600 according to certain teachings of the present disclosure is illustrated. The connector 600 has a plug 602 having contacts 604 and an electromagnet 606. The connector 600 also has a receptacle 620 positioned on a portable computer or electronic device 630. The receptacle 620 has an attraction plate or magnet 622 and contacts 624. The contacts 624 act as paths for electrical communication so that they are electrically coupled to internal electronics 632 of electronic device 630. In addition, the attraction plate or magnet 622 acts as a path of electrical communication so that it is also electrically coupled to the internal electronics 632. In the schematic view of FIG. 14, various components, such as leads, contacts, and coils, are not shown for simplicity.

In the present embodiment, the electromagnet 606 is in the plug 602; however, it can be positioned in the receptacle 620. The electromagnet 606 derives its power from circuitry 612 of the power adapter 608 so the electromagnet 606 does not drain a battery (not shown) of the electronic device 630. In the present embodiment, the plug 602 includes a switch element 610 interrupting the electrical connection between the electromagnet 606 and the circuitry 612 of the adapter 608.

In one embodiment, the switch element 610 includes a mechanical switch that a user presses to turn the electromagnet 602 on and off. Any mechanical switch, such as a conventional micro-switch, for controlling the power load of the electromagnet 602 is suitable for the connector 600. In general, the switch element 610 allows the electromagnet 606 to run directly from power of the adapter 608.

In another embodiment, the switch element 610 includes a touch sensor that energizes (e.g., turns on) the electromagnet 606 when a user touches the sensor 610 by picking up the plug 602. Touch sensors are known in the art. For example, the touch sensor 610 can include logic circuitry and contacts (not shown) and can use principals of capacitance of the human body for operation. Once activated by the touch sensor 610, the electromagnet 606 can remain energized for a time interval to allow the user to couple the plug 602 to the receptacle 620 and to turn on the electronic device 630. Once the energized electromagnet 606 is magnetically coupled to the attraction plate 622 of the receptacle 650, the contacts 604 and 624 that form a signal path between the adapter 608 and the device 630, and a signal along the signal path can be used to keep the touch sensor 610 activated and the electromagnet 606 energized.

While the plug 602 is connected and the electromagnet 606 energized, the touch sensor 610 can turn off the electromagnet 606 when touched to allow the user to disconnect the plug 602. Alternatively, the touch sensor 610 can reduce the energization of the electromagnet 606 to enable easy removal by the user but to keep a small remaining attraction. In addition, when the device 630 is turned off, the device 630 may no longer send a signal along the signal path of the contacts 604 and 624 or may send a quit signal to the touch sensor 610 to stop energization of the electromagnet 606. Then, the de-energized electromagnet 606 can allow the plug 602 to be released from the electronic device 630.

In yet another embodiment, the switch element 610 includes a motion sensor, which detects when the plug 602 is moved. The motion sensor 610 can maintain the electromagnet 606 energized for a time interval to allow the user to couple the plug 602 with the receptacle 620 and to turn on the electronic device 630. Once coupled, the signal path formed by contacts 604 and 624 can allow a signal to control the circuitry of the motions sensor 610 to maintain it activated while coupled to the device 630. The motion sensor 610 can automatically shut off the electromagnet 606 so as to release the plug 602 from the device 630 if a sudden movement occurs (e.g., the device 630 is dropped or pulled away with the plug 602 connected).

Figure 15:
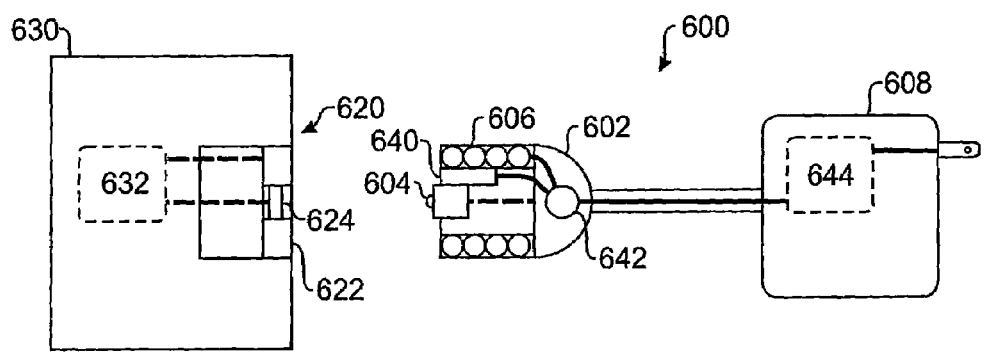
FIG. 15 illustrates an embodiment of a magnetic connector according to certain teachings of the present disclosure having an electromagnet and a proximity sensor.

Referring to FIG. 15, an embodiment of a magnetic connector 600 according to certain teachings of the present disclosure is illustrated having an electromagnet 606 and a proximity sensor 640. Reference numerals in FIG. 15 that are the same as those in other Figures represent like components between embodiments. The proximity sensor 640 is positioned in the plug 602 and is coupled to a switch element 642. The electromagnet 606 is also coupled to the switch element 642, which in turn is coupled to circuitry 644 for providing power located in the adapter 608. The proximity sensor 640 and switch element 642 turn on the electromagnet 606 when the sensor 640 is positioned near plate 622 of the receptacle 620.

In one embodiment, the proximity sensor 640 includes a Hall Effect sensor, which detects magnetic field levels. In use, the electromagnet 606 is initially energized before being coupled to the receptacle 620. The initial energization can be achieved, for example, when the adapter 608 is coupled to a power source (not shown) or when a touch sensor (not shown) or the like is activated by the user. The initial energization can be less than that necessary to magnetically couple the electromagnet 606 to the plate 622. Once the plug 602 is moved in proximity to the receptacle 622, the magnetic field associated with the initial energization of the electromagnet 606 is changed, which is subsequently detected by the Hall Effect sensor 640. The sensor 640, in turn, causes the energization of the electromagnet 606 to be increased to allow it to magnetically couple to the attraction plate 622.

Figure 16:
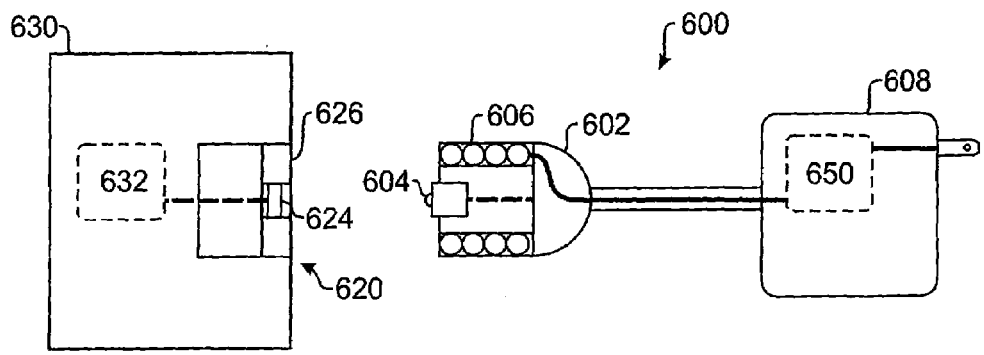
FIG. 16 illustrates an embodiment of a magnetic connector according to certain teachings of the present disclosure having an electromagnet and fault detector.

Referring to FIG. 16, an embodiment of a magnetic connector 600 according to certain teachings of the present disclosure is illustrated having an electromagnet 606 and fault detection circuitry 650. Reference numerals in FIG. 16 that are the same as those in other Figures represent like components between embodiments. As before, the electromagnet 606 is energized to magnetically couple with the attraction plate 626 of receptacle 620, which can be ferromagnetic material or a permanent magnet. The fault detection circuitry 650 detects a fault event caused, for example, by a surge or spike in the power supply.

The fault detection circuitry 650 can be similar to that commonly used in the art for power adapters. In one embodiment, for example, the fault detection circuitry 650 can include circuitry for detecting an over-current. In another embodiment, for example, the fault detection circuitry 650 can include circuitry for detecting an over-temperature.

When the fault detection circuitry 650 detects a fault event, the circuitry 650 can stop energizing the electromagnet 606 and allow the plug 602 to be released from the embodiment of the receptacle 620 having a ferromagnetic attraction plate 626. Alternatively, the circuitry 650 can reverse the direction of current supplied through the electromagnet 606 so the electromagnet 606 is repelled by the polarity of the embodiment of the receptacle 620 having a permanent magnet on the attraction plate 626. It will be appreciated that the electromagnet 606 and fault circuitry 650 can be positioned on the device 630 while the attraction plate can be positioned on the plug 602 of the connector 600 to achieve the same protection.

Figure 17:
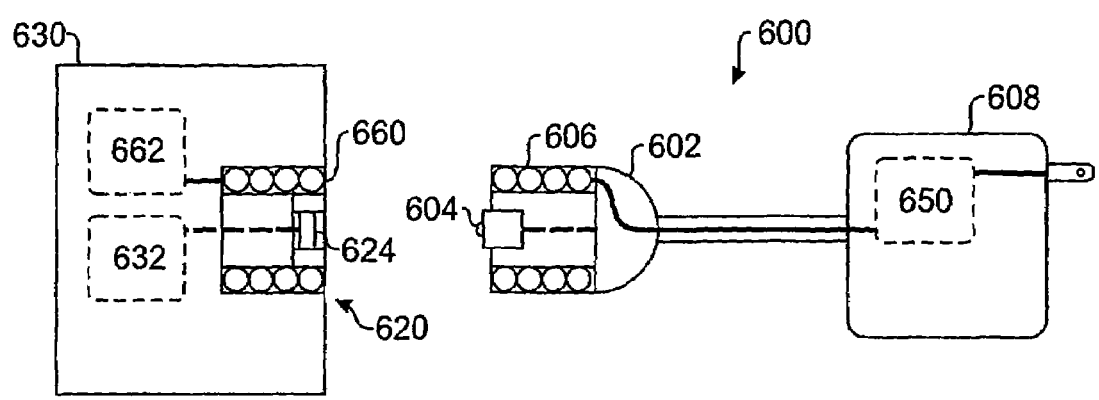
FIG. 17 illustrates an embodiment of a magnetic connector according to certain teachings of the present disclosure having two electromagnets and fault detector.

Referring to FIG. 17, an embodiment of a magnetic connector 600 according to certain teachings of the present disclosure is illustrated having two electromagnets 606 and 660. The plug 602 has the first electromagnet 606, which is energized by the power adapter 608. The receptacle 620 positioned in the device 630 has the second electromagnet 660, which is power by an internal power supply 662, such as a battery. The two electromagnets 606 and 660 have opposite polarities allowing them to be magnetically coupled.

In one embodiment, the adapter 608 includes fault detection circuitry 650. When a fault is detected by fault detection circuitry 662, the polarity of the first electromagnet 606 can be reversed by the circuitry 650 so that the first and second electromagnets 606 and 660 repel one another and actively prevent connection.

In another embodiment, the adapter 608 includes circuitry 650 for identifying the adapter 608. For example, the identification circuitry 650 can identify a type of electronic device to which it is intended to be connected or can even identify a specific device to which is can only be used. When a user intends to connect the plug 602 to the receptacle 620, the first electromagnet 606 can be energized according to the techniques disclosed herein. However, the second electromagnet 660 can remain de-energized. When the user positions the plug 602 against the receptacle 620, the signal path formed by contacts 604 and 624 allow the identification circuitry 650 to send a signal to the internal electronics 632 of the device, which can identify the adapter 608 being connected to the device 630.

If the adapter 608 is intended for the device 630, then the second electromagnet 660 can be energized with opposite polarity to couple with the first electromagnet 606, or the second electromagnet 660 can remain de-energized while the first electromagnet 606 is simply allowed to magnetically couple with the ferromagnetic components of the de-energized electromagnet 660. If, on the other hand, the adapter 608 is not intended for the device 630, then the second electromagnet 660 can be energized with the same polarity to repel the first electromagnet 606 and actively prevent connection.

Figure 18:
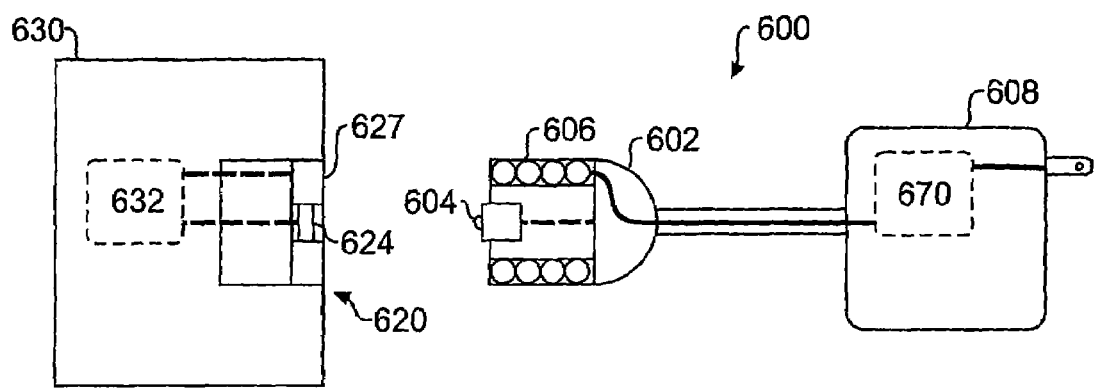
FIG. 18 illustrates an embodiment of a magnetic connector according to certain teachings of the present disclosure having an electromagnet and control circuitry.

Referring to FIG. 18, an embodiment of a magnetic connector 600 according to certain teachings of the present disclosure is illustrated having an electromagnet 606 and control circuitry 670. In one embodiment, the control circuitry 670 includes a switch element, which receives a control signal from the internal electronics 632 of the device 630. When the battery of the electronic device 630 is fully charged, the internal electronics 632 sends a control signal to the control circuitry 670 via the signal path formed by contacts 604 and 624. Moreover, when the internal electronics 632 detects a fault, it can send a control signal to the control circuitry 670.

As described above, one of the contacts 604 on the plug 602 and one of the contracts 624 on the receptacle 620 (preferably, the centrally located contacts 604 and 624) can form a signal path between the device 630 and the adapter 608. It is along such a signal path that the control signal indicating the fully charged battery is sent. When the signal for "full charge" is received, the control circuitry 670 causes its internal switch element to stop energization of the electromagnet 606, and the plug 602 becomes decoupled from the receptacle 626. If it is desirable to keep the plug 602 magnetically coupled, albeit slightly, to the receptacle 620 even after full charging of the battery, the plate 627 on the receptacle 620 can include a magnet (not shown) for maintaining at least some magnetic coupling with ferromagnetic material of the electromagnet 606.

In another embodiment, the control circuitry 670 receives a control signal, which governs whether the adapter 608 associated with the control circuitry 670 can operate with the electronic device 630. In this embodiment, the internal electronics 632 on the device 630 produces a control signal that identifies, the device 630, such as by its make or model. The control signal can be a digital signal, for example, identifying the device 630. The control circuitry 670 in the adapter 608 is pre-configured to energize the electromagnet 606 only when the identifying control signal is received. To respond to the control signal, the control circuitry includes a switch element for controlling the electrical connection of the electromagnet 606 with its energizing source, and the circuitry includes a logic element for interpreting the control signal and activating the switch element.

Thus, when a user positions the plug 602 against the receptacle 620 to connect them, the signal contacts 604 and 624 on the plug and receptacle 602 and 620 will make contact, allowing the internal electronics 632 of the device 630 to communicate its identifying control signal to the control circuitry 670 of the adapter 608. If the circuitry 670 receives the correct signal, an internal switch within the circuitry causes the electromagnet 606 to be energized for coupling with the receptacle. Otherwise, the electromagnet will not be energized, and the plug 602 will not stay coupled to the receptacle 620.

Accordingly, the electromagnet 606 on the adapter 608 will only be energized for a particular model or type of device, which may prevent the possibility of a user inadvertently coupling an adapter with a specific power rating to a device requiring a different power rating. For example, harm to a computer can be prevented because the computer will not allowing itself to be connected to the wrong type of power adapter (e.g., one that supplies a higher voltage than the computer's specification). Furthermore, the control circuitry 670 and identification of the device 630 can be configured so that the device 630 will only draw power only from a particular power adapter or a group of power adapters. Such a configuration can be useful in various settings, such as a school or other public organization, to discourage theft.

In yet another embodiment, the control circuitry 670 includes a security system, which requires the user to enter a particular code or other identification. Without the entered code, the control circuitry 670 will not energize the electromagnet, and the plug 602 will not engage with the receptacle 620.

In the present disclosure, embodiments of magnetic connectors have been disclosed in the context of providing power from a transformer to a laptop computer. However, it will be appreciated with the benefit of the present disclosure that the subject matter of the present disclosure is applicable to various types of connectors, which provide electrical connection in the form of power and/or signals between an electronic device and any of a number of electronic devices or electrical relations. For example, other applicable electronic devices or electrical relations include portable DVD players, CD players, radios, printers, portable memory devices, portable disk drives, input/output devices, power sources, batteries, etc. Other applicable types of electrical connections that can be provided by the connectors of the present disclosure include Universal Serial Bus, D-subminiature, FireWire, network connectors, docking connectors, etc.

In the present disclosure, a number of embodiments of magnetically coupleable connectors are disclosed. With the benefit of the present disclosure, it will be appreciated that aspects or features of one embodiment disclosed herein can be used in or combined with aspects and features of other embodiments disclosed herein to produce additional embodiments consistent with the teachings of the present disclosure.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A magnetic connector system comprising: a first connector having a first plurality of electrical contacts and a plurality of magnets; and a second connector having a second plurality of electrical contacts and a magnetic element, the second plurality of electrical contacts being adapted to mate with the first plurality of electrical contacts when the first connector couples to the second connector, wherein the plurality of magnets of the first connector are proximally located and are arranged in opposing polarities with respect to each other so that when the first connector is brought in close proximity to the second connector, magnetic field lines travel through the magnetic element of the second connector from one of the plurality of magnets in the first connector to another one of the plurality of magnets in the first connector, thereby increasing magnetic attraction between the first connector and the second connector.

2. The magnetic connector system of claim 1 wherein the magnetic element of the second connector comprises an attraction plate made of ferromagnetic material.

3. The magnetic connector system of claim 1 wherein the magnetic element of the second connector comprises an attraction plate made of permanent magnet.

4. The magnetic connector system of claim 2 wherein the attraction plate comprises one or more openings for passage of the first plurality of electrical contacts.

5. The magnetic connector system of claim 1 wherein when the first connector couples to the second connector, the first and second plurality of electrical contacts define a corresponding plurality of electrical communication paths.

6. The magnetic connector system of claim 5 wherein the plurality of electrical communication paths comprises at least one electrical power path and at least one signal path.

7. The magnetic connector system of claim 6 wherein the at least one signal path conveys information regarding a device coupled to the first connector.

8. The magnetic connector system of claim 5 wherein when the first connector couples to the second connector, the plurality of magnets and the magnetic element define an additional electrical communication path.

9. The magnetic connector system of claim 1 wherein at least one of the plurality of magnets is disposed on a first side of the first plurality of electrical contacts and at least another one of the plurality of magnets is disposed on a second side of the first plurality of electrical contacts.

10. The magnetic connector system of claim 1 wherein the magnetic attraction between the first connector and the second connector maintains both physical and electrical contact between the first connector and the second connector without requiring an interference fit.

11. The magnetic connector system of claim 10 wherein the first connector can break free from the second connector when pulled away from each other by a non-axial force.

12. The magnetic connector system of claim 1 wherein the first connector is disposed inside an electronic device.

13. The magnetic connector system of claim 1, wherein the first connector further includes a first alignment mechanism and the second connector further includes a second alignment mechanism, wherein the first alignment mechanism and the second alignment mechanism align the first connector with the second connector when the first connector is positioned proximally to the second connector.

14. The magnetic connector system of claim 1 wherein the first plurality of electrical contacts is mechanically biased to provide compressive force to improve electrical contact when the first connector and the second connector are mated.

15. The magnetic connector system of claim 1 wherein the first connector and the second connector include two axes of symmetry and are adapted to couple together along one of the two axes of symmetry.

16. A magnetic connector system comprising:
a first connector comprising:

a first plurality of electrical contacts, the first plurality of electrical contacts to mate with a second plurality of electrical contacts when the first connector couples to a second connector, wherein when the first connector couples to the second connector, the first and second plurality of electrical contacts define a corresponding plurality of electrical paths, wherein the plurality of electrical paths comprises at least one electrical power path and at least one signal path to convey a signal; and a magnetic element, the magnetic element to mate with a plurality of magnets in the second connector that are proximally located and arranged in opposing polarities with respect to each other so that when the first connector is brought in close proximity to the second connector, magnetic field lines travel through the magnetic element of the first connector from one of the plurality of magnets in the second connector to another one of the plurality of magnets in the second connector.

17. The magnetic connector system of claim 16 wherein the signal conveys information used to determine a type of device coupled to the first connector.

18. The magnetic connector system of claim 16 wherein the magnetic element of the first connector comprises an attraction plate made of ferromagnetic material.

19. The magnetic connector system of claim 16 wherein the magnetic element of the first connector comprises an attraction plate made of permanent magnet.

20. The magnetic connector system of claim 18 wherein the attraction plate comprises one or more openings for passage of the first plurality of electrical contacts.

21. The magnetic connector system of claim 16 wherein when the first connector couples to the second connector, the plurality of magnets and the magnetic element define an additional electrical path.

22. The magnetic connector system of claim 16 wherein the magnetic attraction between the first connector and the second connector maintains both physical and electrical contact between the first connector and the second connector without requiring an interference fit.

23. The magnetic connector system of claim 22 wherein the first connector can break free from the second connector when pulled away from each other by a non-axial force.

24. The magnetic connector system of claim 16 wherein the first connector comprises a plug attached to a cable.

25. The magnetic connector system of claim 16 wherein the magnetic element forms a first alignment mechanism and the second connector further includes a second alignment mechanism, wherein the first alignment mechanism and the second alignment mechanism align the first connector with the second connector when the first connector is positioned proximally to the second connector.

26. The magnetic connector system of claim 16 wherein the first connector and the second connector include two axes of symmetry and mate together along one of the two axes of symmetry.

27. The magnetic connector system of claim 16 further comprising:
the second connector comprising:
the second plurality of contacts; and
the plurality of magnets, wherein the plurality of magnets are proximally located and arranged in opposing polarities with respect to each other.

28. A magnetic connector system comprising:
a first connector comprising:

a plurality of movable first contacts to make electrically conductive paths with a plurality of second contacts in a second connector when the first connector is mated with the second connector, each of the movable first contacts biased by one of a plurality of first springs; and a fixed magnetic element, the fixed magnetic element to mate with a plurality of magnets in the second connector that are proximally located and arranged in opposing polarities with respect to each other so that when the first connector is brought in close proximity to the second connector, magnetic field lines travel through the fixed magnetic element of the first connector from one of the plurality of magnets in the second connector to another one of the plurality of magnets in the second connector.

29. The magnetic connector system of claim 28 wherein the fixed magnetic element has an axis of symmetry such that the first connector can be mated with the second connector in a first position and a second position, wherein the plurality of movable first contacts and the plurality of second contacts form a plurality of electrical paths whether the first connector and the second connector are mated in the first position or the second position.

30. The magnetic connector system of claim 29 wherein the plurality of electrical paths comprises at least one electrical power path and at least one signal path.

31. The magnetic connector system of claim 30 wherein the at least one signal path conveys a signal that is used to determine a type of device coupled to the first connector.

32. The magnetic connector system of claim 28 wherein the fixed magnetic element comprises an attraction plate made of ferromagnetic material.

33. The magnetic connector system of claim 28 wherein the first connector can break free from the second connector when pulled away from each other by a non-axial force.

34. The magnetic connector system of claim 28 further comprising:
the second connector comprising:
the second plurality of contacts; and
the plurality of magnets, wherein the plurality of magnets are proximally located and arranged in opposing polarities with respect to each other.

35. A magnetic connector system comprising:
a first connector comprising:
a plurality of first contacts to make a plurality of electrical paths with a plurality of second contacts in a second connector when the first connector is mated with the second connector;
an attraction plate to be magnetically attracted to a plurality of magnets in the second connector such that the first connector is held in a first direction to the second connector when the first connector is mated with the second connector,
wherein the attraction plate is formed to fit in a recess in the second connector such that the first plurality of contacts are mechanically aligned with the second plurality of contacts in a second direction and a third direction when the first connector is mated with the second connector.

36. The magnetic connector system of claim 35 wherein the plurality of electrical paths comprises at least one electrical power path and at least one signal path.

37. The magnetic connector system of claim 36 wherein the at least one signal path conveys a signal that is used to determine a type of device coupled to the first connector.

38. The magnetic connector system of claim 35 wherein the attraction plate has an axis of symmetry such that the first connector can be mated with the second connector in a first position and a second position.

39. The magnetic connector system of claim 35 wherein each of the first contacts are biased by one of a plurality of first springs.

40. The magnetic connector system of claim 35 wherein the attraction plate is made of ferromagnetic material.

41. The magnetic connector system of claim 35 wherein the first connector can break free from the second connector when pulled away from each other by a non-axial force.

42. The magnetic connector system of claim 35 further comprising:
    the second connector comprising:
        the second plurality of contacts; and
        the plurality of magnets, wherein the plurality of magnets are proximally located and arranged in opposing polarities with respect to each other.

\* \* \* \* \*